(12) United States Patent
Otsuka

(10) Patent No.: US 8,712,111 B2
(45) Date of Patent: Apr. 29, 2014

(54) IMAGE PROCESSING APPARATUS

(75) Inventor: Naoki Otsuka, Tokyo (JP)

(73) Assignee: Oki Data Corporation, Tokyo (JP)

( * ) Notice: Subject to any disclaimer, the term of this patent is extended or adjusted under 35 U.S.C. 154(b) by 283 days.

(21) Appl. No.: 13/023,106

(22) Filed: Feb. 8, 2011

(65) Prior Publication Data

US 2011/0194773 A1     Aug. 11, 2011

(30) Foreign Application Priority Data

Feb. 9, 2010   (JP) .................. 2010-026108

(51) Int. Cl.
*G06K 9/00*     (2006.01)

(52) U.S. Cl.
USPC ........... 382/118; 382/115; 382/117; 382/165; 382/167; 382/243; 382/236; 382/394; 382/107

(58) Field of Classification Search
CPC ........... G06K 9/00221; G06K 9/00281; G06T 2207/30201
USPC ......... 382/118, 115, 117, 165, 167, 243, 236, 382/394, 107, 304
See application file for complete search history.

(56) References Cited

U.S. PATENT DOCUMENTS

| | | | | |
|---|---|---|---|---|
| 7,627,148 | B2 * | 12/2009 | Kaku ........................... | 382/118 |
| 2005/0207648 | A1 * | 9/2005 | Iguchi et al. .................. | 382/190 |
| 2009/0244608 | A1 * | 10/2009 | Tsuji ........................... | 358/1.15 |
| 2010/0008567 | A1 * | 1/2010 | Kakiuchi ....................... | 382/163 |
| 2010/0066822 | A1 * | 3/2010 | Steinberg et al. ............... | 348/77 |

FOREIGN PATENT DOCUMENTS

| | | | |
|---|---|---|---|
| JP | 2005-275935 A | 10/2005 | |
| JP | 2008-052402 A | 3/2008 | |

* cited by examiner

*Primary Examiner* — Mike Rahmjoo
(74) *Attorney, Agent, or Firm* — Kubotera & Associates, LLC

(57) ABSTRACT

An image processing apparatus includes an image inputting unit for inputting a plurality of facial images; a detecting unit for detecting a facial region of each of the facial images; a correction ratio calculating unit for calculating a correction ratio of the facial region of each of the facial images; a position calculating unit for calculating a positional deviation of the facial region of each of the facial images; and a correcting unit for correcting a layout of each of the facial images through enlarging or reducing each of the facial images according to the correction ratio and moving each of the facial images according to the positional deviation.

14 Claims, 10 Drawing Sheets

| Process | Parameter | | |
|---|---|---|---|
| Background | Background ON/OFF | BG_FLG | 20a |
| | Background removal color/image | BG_MATERIAL | 20b |
| Layout | Output sheet pixel number | (OUTX, OUTY) | 20d |
| | One page photograph lateral number | OUTX_NUM | 20e |
| | One page photograph vertical number | OUTY_NUM | 20f |
| | Upper edge margin | MARGIN_T | 20g |
| | Lower edge margin | MARGIN_B | 20h |
| | Right edge margin | MARGIN_R | 20i |
| | Left edge margin | MARGIN_L | 20j |
| | Width margin | MARGIN_W | 20k |
| | Height margin | MARGIN_H | 20l |
| Facial images input | Input photograph list | INFILES | 20m |
| | Input photographic image number | INNUM | 20c |

FIG. 2

| Image ID | Photograph image information | Facial region | | |
|---|---|---|---|---|
| | | Center coordinate | Long axis length | Short axis length |
| 1 | *pointer1-1 | (fx1, fy1) | fl1 | fs1 |
| 2 | *pointer2-1 | (fx2, fy2) | fl2 | fs2 |
| : | | | | |

IMAGE PROCESSING APPARATUS

BACKGROUND OF THE INVENTION AND RELATED ART STATEMENT

The present invention relates to an image processing apparatus.

In a conventional image processing apparatus capable of editing a plurality of facial images, it is possible to create a layout image such as a school photo album, in which a plurality of facial images is arranged and displayed (Refer to Patent Reference). In order to select a group of facial images to be edited in the layout image, a plurality of candidate images per each individual face is registered. Then, a facial image having, for example, a greatest degree of smile is automatically selected per each individual.

Patent Reference: Japanese Patent Publication No. 2008-052402

In the conventional image processing apparatus described above, the facial images thus selected may be taken under different circumstances and conditions. Accordingly, the facial images may have differences in a size of a face, a position of a face, brightness, a background, and the like. As a result, it is difficult to create the layout image with high quality.

In view of the problems described above, an object of the present invention is to provide an image processing apparatus capable of solving the problems of the conventional image processing apparatus. In the present invention, it is possible to output a layout image with high quality through correcting a facial image according to a position of a facial region of the facial image and an enlargement/reduction ratio of the facial region.

Further objects and advantages of the invention will be apparent from the following description of the invention.

SUMMARY OF THE INVENTION

In order to attain the objects described above, according to an aspect of the present invention, an image processing apparatus includes an image inputting unit for inputting a plurality of facial images; a detecting unit for detecting a facial region of each of the facial images; a correction ratio calculating unit for calculating a correction ratio of the facial region of each of the facial images; a position calculating unit for calculating a positional deviation of the facial region of each of the facial images; and a correcting unit for correcting a layout of each of the facial images through enlarging or reducing each of the facial images according to the correction ratio and moving each of the facial images according to the positional deviation.

In the aspect of the present invention, the image processing apparatus includes the correcting unit for correcting the layout of each of the facial images according to the position of the facial region of each of the facial images and the correction ratio of the facial region of each of the facial images. Accordingly, it is possible to output a layout image with high quality.

BRIEF DESCRIPTION OF THE DRAWINGS

FIG. 2 is a schematic view showing an example of parameters input through a parameter inputting unit of the image processing apparatus according to the first embodiment of the present invention;

DETAILED DESCRIPTION OF PREFERRED EMBODIMENTS

Hereunder, embodiments of the present invention will be explained with reference to the accompanying drawings.

First Embodiment

Figure 1:
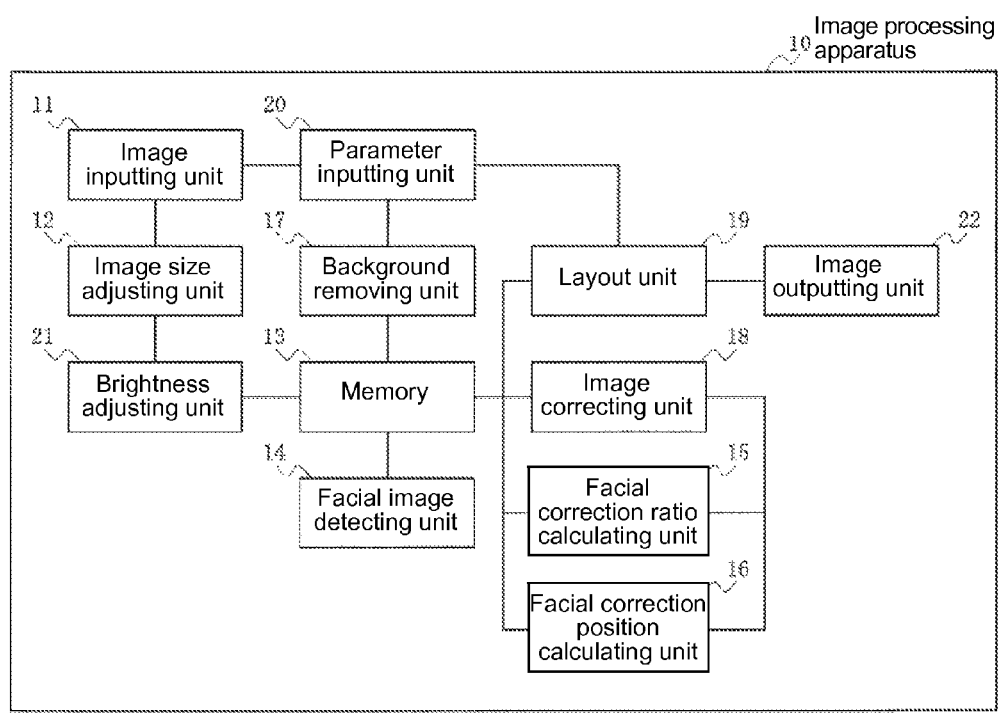
FIG. 1 is a block diagram showing a configuration of an image processing apparatus according to a first embodiment of the present invention.

A first embodiment of the present invention will be explained. FIG. 1 is a block diagram showing a configuration of an image processing apparatus 10 according to the first embodiment of the present invention. FIG. 2 is a schematic view showing an example of parameters input through a parameter inputting unit 20 of the image processing apparatus 10 according to the first embodiment of the present invention.

Figure 3:
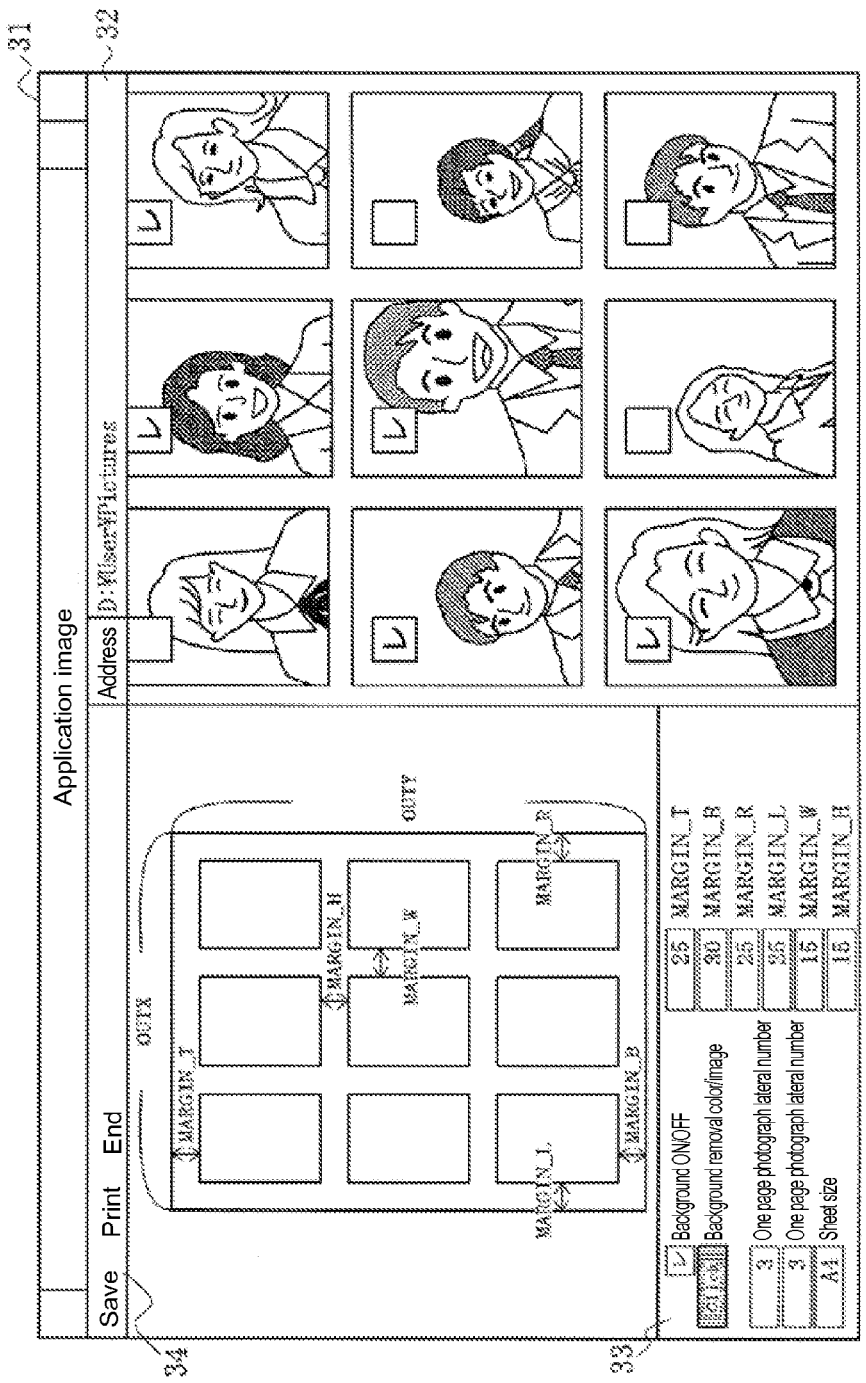
FIG. 3 is a schematic view showing an example of an application image of the image processing apparatus according to the first embodiment of the present invention.
Figure 4:
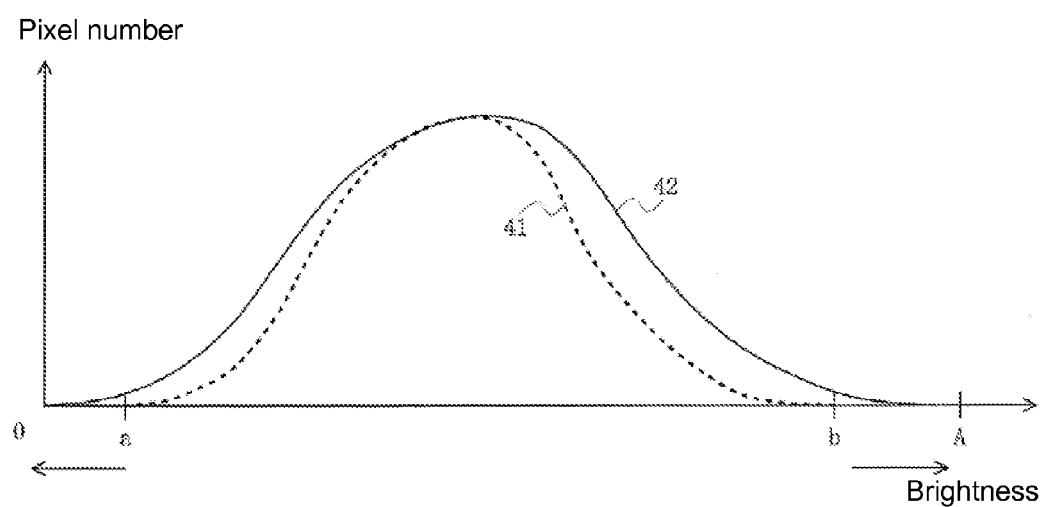
FIG. 4 is a graph showing a brightness histogram of a brightness adjusting unit of the image processing apparatus according to the first embodiment of the present invention.
Figures 5, 6:
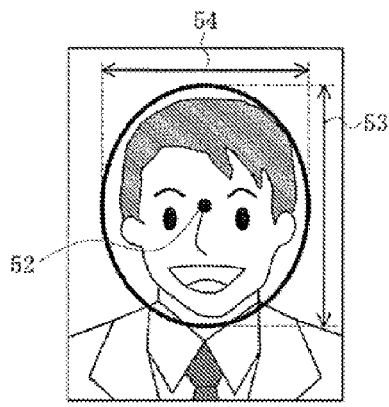
FIG. 5 is a schematic view showing an example of an arrangement table stored in a storage unit of the image processing apparatus according to the first embodiment of the present invention.
FIG. 6 is a schematic view showing an example of a facial region detected with a facial image detecting unit of the image processing apparatus according to the first embodiment of the present invention.

FIG. 3 is a schematic view showing an example of an application image 31 of the image processing apparatus 10 according to the first embodiment of the present invention. FIG. 4 is a graph showing a brightness histogram of a brightness adjusting unit 21 of the image processing apparatus 10 according to the first embodiment of the present invention. FIG. 5 is a schematic view showing an example of an arrangement table stored in a storage unit or a memory 13 of the image processing apparatus 10 according to the first embodiment of the present invention.

Figures 7A, 7B:
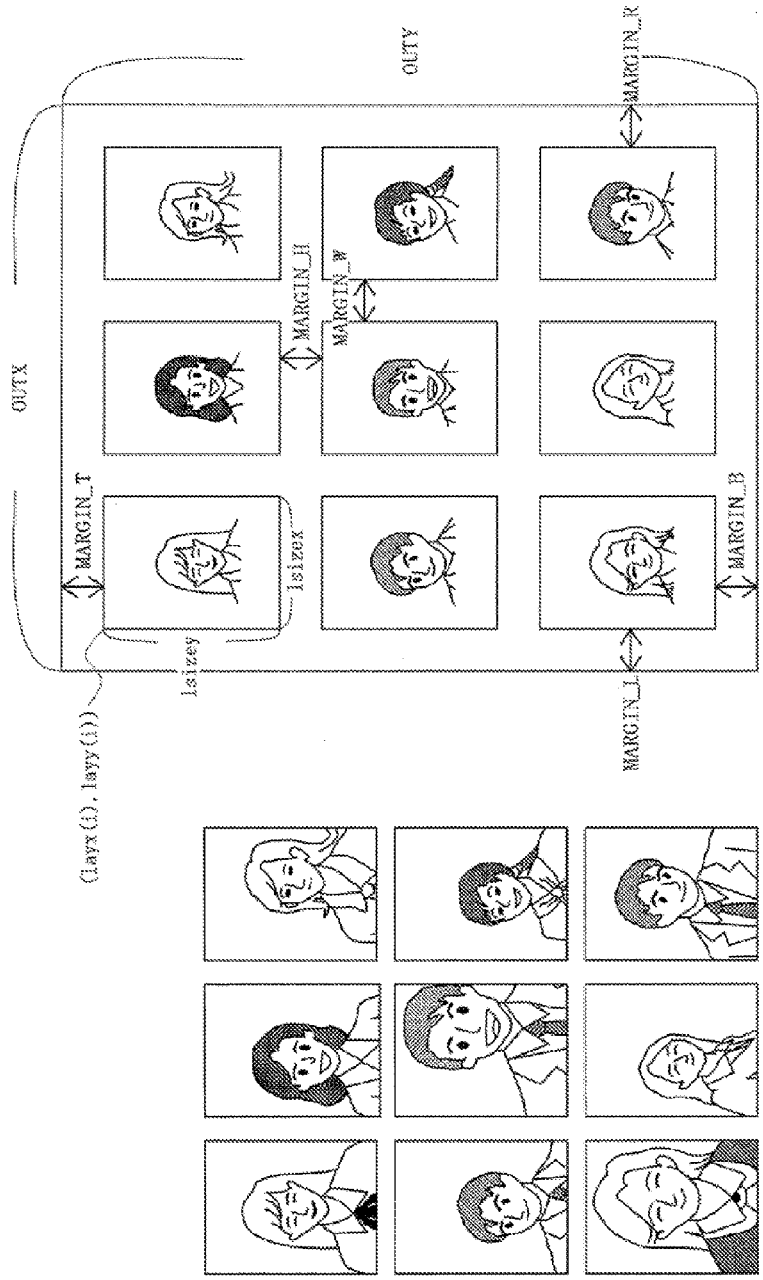
FIGS. 7($a$) and 7($b$) are schematic views showing an example of facial images and a layout image of the image processing apparatus according to the first embodiment of the present invention, wherein FIG. 7($a$) is a schematic view showing an example of facial images input in the image processing apparatus, and FIG. 7($b$) is a schematic view showing an example of a layout image in which the facial images are collected and arranged.

FIG. 6 is a schematic view showing an example of a facial region detected with a facial image detecting unit 14 of the image processing apparatus 10 according to the first embodiment of the present invention. FIGS. 7($a$) and 7($b$) are schematic views showing an example of facial images and a layout image of the image processing apparatus 10 according to the first embodiment of the present invention. More specifically, FIG. 7($a$) is a schematic view showing an example of facial images input in the image processing apparatus 10, and FIG. 7(b) is a schematic view showing an example of a layout image in which the facial images are collected and arranged.

In the embodiment, the image processing apparatus 10 or a personal computer 10 is capable of editing a plurality of facial images through an operation according to a processing application installed therein. The personal computer 10 includes a calculation unit such as a CPU, an MPU, and the like; a storage unit such as a magnetic disk, a semiconductor memory, and the like; a display unit such as a CRT, a liquid crystal display, and the like; an inputting unit such as a mouse, a keyboard, and the like; a communication interface; and the like. The personal computer 10 may be any apparatus as far as the personal computer 10 is capable of performing an operation according to the processing application.

In the embodiment, the image processing apparatus 10 is capable of outputting a layout image in which a plurality of facial images is arranged. As shown in FIG. 1, the image processing apparatus 10 includes an image inputting unit 11; an image size adjusting unit 12; the memory 13 as the storage unit; the facial image detecting unit 14 as a detecting unit; a facial correction ratio calculating unit 15 as a correction ratio calculating unit; a facial correction position calculating unit 16 as a position calculating unit; a background removing unit 17; an image correcting unit 18 as a correcting unit; a layout unit 19; the parameter inputting unit 20; the brightness adjusting unit 21; and an image outputting unit 22.

In the embodiment, the parameter inputting unit 20 is a user interface for providing a parameter necessary for the background removing unit 17 and the image outputting unit 22 to perform a process, or for selecting an image to be input in the image inputting unit 11. More specifically, the parameter inputting unit 20 is displayed on the display unit of the image processing apparatus 10, and is operated through the inputting unit of the image processing apparatus 10 such as the keyboard and the mouse.

FIG. 2 is the schematic view showing the example of the parameters input through the parameter inputting unit 20 of the image processing apparatus 10 according to the first embodiment of the present invention. More specifically, the parameters necessary for the background removing unit 17 to perform a process include a background ON/OFF 20a (BG_FLG) and a background removal color/image 20b (BG_MATERIAL) indicating a background color to fill or an image.

Further, the parameters necessary for the layout unit 19 to perform a process include an output sheet pixel number 20d (OUTX, OUTY) indicating a pixel number of the layout image to be output; a one page photograph lateral number 20e (OUTX_NUM) indicating the number of facial photographs arranged laterally; a one page photograph vertical number 20f (OUTY_NUM) indicating the number of the facial photographs arranged vertically; an upper edge margin 20g (MARGIN_T) indicating an upper edge margin of the layout image; a lower edge margin 20h (MARGIN_B) indicating a lower edge margin of the layout image; a right edge margin 20i (MARGIN_R) indicating a right edge margin of the layout image; a left edge margin 20j (MARGIN_L) indicating a left edge margin of the layout image; a width margin 20k (MARGIN_W) indicating a width margin of the layout image; and a height margin 20l (MARGIN_H) indicating a height margin of the layout image.

Further, the parameters necessary for the image inputting unit 11 to perform a process include an input photographic image number 20c (INNUM) indicating the number of the facial images input; and an input photograph list 20m (INFILES) storing a file path list of the magnetic disk of the image processing apparatus 10, which stores a facial image group to be processed, in an arrangement variable.

FIG. 3 is the schematic view showing the example of the application image 31 as a user interface for realizing the parameter inputting unit 20. The application image 31 is displayed on the display unit of the image processing apparatus 10. As shown in FIG. 3, the application image 31 is divided into left side and right side pains, i.e., display regions.

In the embodiment, the right side pain is an input photograph selecting pain 32 for specifying a path of the storage unit of the image processing apparatus 10, so that an input photograph as the facial image to be input is selected from an image file list in the storage unit. The input photograph selecting pain 32 includes a check box at each thumbnail of the image file of the path thus specified. When the check box is checked, the image file is selected as the input photograph. Further, the path of the photographic image is registered in the input photograph list 20m (INFILES), and the number of the photographs input and currently selected is stored in the input photographic image number 20c (INNUM).

In the embodiment, the left side pain is a parameter setting pain 33 for setting a parameter, so that the image processing apparatus 10 performs a process. The parameter setting pain 33 includes checkboxes and text boxes. When a user specifies some of the checkboxes and the text boxes, it is possible to specify each of the parameters from the background ON/OFF 20a (BG_FLG) to the right edge margin 20i (MARGIN_R), and from the left edge margin 20j (MARGIN_L) to the height margin 20l (MARGIN_H).

In the embodiment, in the output sheet pixel number 20d (OUTX, OUTY), it is possible to specify a sheet size such as A4, A5, and the like. Alternatively, it may be configured such that the output sheet pixel number 20d (OUTX, OUTY) can be automatically calculated from a sheet size specified in the parameter inputting unit 20.

In the embodiment, the application image 31 further includes a menu bar 34 arranged at an upper portion thereof for selecting various commands. More specifically, the menu bar 34 includes a print command for starting a process according to the parameter specified on the application image 31 to print a process result; a save command for storing the process result in the disk as the image file; an end command for terminating an application; and the like.

In the embodiment, the image inputting unit 11 is provided for obtaining and inputting the facial images of each individual from the storage unit of the image processing apparatus 10 such as the magnetic disk and the like or a storage device such as an external memory connected to the image processing apparatus 10 according to the input photograph list 20m (INFFILES) specified through the parameter inputting unit 20. Each of the facial images is an individual photographic image of one individual as an object. A plurality of facial images to be arranged in the layout image is input through the image inputting unit 11.

In the embodiment, when the facial images input through the image inputting unit 11 have various image sizes, the image size adjusting unit 12 is provided for adjusting the facial images to a specific size through enlarging or reducing an image, and for transmitting the facial images thus adjusted to the brightness adjusting unit 21. When the facial image has an aspect ratio different from that of the specific size, the image size adjusting unit 12 adjusts the facial image to a maximum side within the specific size through enlarging or reducing the facial image while maintaining the aspect ratio as is.

In the embodiment, when the facial images input through the image inputting unit 11 have various degrees of brightness due to a photo shooting condition, the brightness adjusting unit 21 is provided for automatically adjusting brightness and/or contrast of the facial images, and for transmitting the facial images thus adjusted to the memory 13.

In the embodiment, the brightness adjusting unit 21 functions as a part of the image inputting unit 11, and is arranged to normalize a brightness distribution of the facial images.

An operation of the brightness adjusting unit 21 for normalizing the brightness distribution of the facial images will be explained next. When the image size adjusting unit 12 adjusts the image size of the facial image, and transmits the facial image to the brightness adjusting unit 21, the brightness adjusting unit 21 obtains a minimum value a and a maximum value b of brightness through scanning all pixels of the facial image. According to the minimum value a and the maximum value b of brightness, the brightness adjusting unit 21 generates a brightness conversion formula for normalizing the brightness distribution of the facial image thus obtained.

In the embodiment, it is supposed that the image processing apparatus 10 can handle brightness from a minimum value of zero to a maximum value of A. Further, it is supposed that a before conversion pixel number is L_BEFORE and an after conversion pixel number is L_AFTER. The brightness conversion formula is given as the following equation (1):

$$L\_AFTER = (L\_BEFORE - a) \times A / (A + a - b) \quad (1)$$

In the embodiment, the brightness adjusting unit 21 converts brightness of all pixels of the facial image thus obtained with the equation (1), and outputs the facial image thus converted.

FIG. 4 is a graph showing a brightness histogram of the brightness adjusting unit 21 of the image processing apparatus 10 according to the first embodiment of the present invention. In FIG. 4, the brightness histogram of the facial image is represented with a hidden line 41 before brightness is converted according to the equation (1), and the brightness histogram of the facial image is represented with a solid line 42 after brightness is converted according to the equation (1).

In the embodiment, the memory 13 is provided for attaching a unique image ID to each of the facial images and storing the facial images after the image inputting unit 11 inputs the facial images and the brightness adjusting unit 21 adjusts the facial images. Further, the memory 13 is configured to have an area for storing related information.

FIG. 5 is a schematic view showing an example of an arrangement table 13a stored in the memory 13 or the storage unit of the image processing apparatus 10 according to the first embodiment of the present invention.

In the embodiment, the arrangement table 13a includes an image ID 13b uniquely attached to each of the facial images, and a photograph image information 13c indicating a pointer in the memory 13 to the facial image thus stored. Further, the arrangement table 13a includes areas for storing a center coordinate 13d of the facial region as the related information; a long axis length 13e of the facial region; and a short axis length 13f of the facial region.

In the embodiment, the facial image detecting unit 14 is provided for detecting a face in the facial image stored in the memory 13. More specifically, the facial image detecting unit 14 is configured to detect the facial region and a center point of the facial region in each of the facial images.

An operation of the facial image detecting unit 14 for detecting the facial region and the center point of the facial region will be explained next. FIG. 6 is a schematic view showing an example of the facial region detected with the facial image detecting unit 14 of the image processing apparatus 10 according to the first embodiment of the present invention.

In the embodiment, first, the facial image detecting unit 14 conducts binarization as a preparation step. Then, the facial image detecting unit 14 removes noises to detect an edge through a well-known labeling process, a contraction diffusion process, and the like. After the facial image detecting unit 14 removes noises, the facial image detecting unit 14 detects a largest oval in the facial image through an oval shape pattern matching, so that the facial image detecting unit 14 determines the facial region in the facial image. Accordingly, as shown in FIG. 6, the facial image detecting unit 14 detects the facial region surrounded with an oval. Further, the facial image detecting unit 14 stores a facial region long axis length 53 and a facial region short axis length 54 in the memory 13.

In the embodiment, according to the arrangement table 13a stored in the memory 13, the facial correction ratio calculating unit 15 is provided for calculating the correction ratio fr(i) of the facial region in each of the facial images corresponding to all image IDs. More specifically, from the long axis length 13e (fli, where i is the image ID) and the long axis length 13e (fli, where i is the image ID) in the arrangement table 13a, the facial correction ratio calculating unit 15 calculates an area fa(i) (where i is the image ID) of the facial region in each of the facial images corresponding to all image IDs. Then, the facial correction ratio calculating unit 15 calculates a ratio of the area fa(i) to an average area fa_AVE of the facial regions of the facial images corresponding to all image IDs. The ratio thus calculated is defined as a correction ratio fr(i) (where i is the image ID).

In the embodiment, the area fa(i) of the facial region, the average area fa_AVE of the facial regions, and the correction ratio fr(i) of the facial region are expressed with the following equations (2) to (4):

$$fa(i) = \pi \times fli \times fsi / 2 \quad (2)$$

$$fa\_AVE = [\{fa(1) + fa(2) + \ldots + fa(INNUM)\} / INNUM] \quad (3)$$

$$fr(i) = fa\_AVE / fa(i) \quad (4)$$

where π is the circular constant.

In the embodiment, according to the arrangement table 13a in the memory 13, the facial correction position calculating unit 16 is provided for calculating a positional correction value fp(i) of the facial region in each of the facial images corresponding to all image IDs. More specifically, the facial correction position calculating unit 16 calculates a difference between the center coordinate 13d (fxi, fyi, where i is the image ID) as the center point of the facial region in each of the facial images corresponding to all image IDs stored in the arrangement table 13a and a center coordinate average (fx_AVE, fy_AVE) of the facial regions of the facial images corresponding to all image IDs, that is, a positional deviation of the facial region in each of the facial images. The difference is defined as the positional correction value fp(i) (where i is the image ID) of the facial region in each of the facial images corresponding to all image IDs.

In the embodiment, the center coordinate average (fx_AVE, fy_AVE) of the facial regions and coordination fpx(i) and fpy(i) of the positional correction value fp(i) of the facial region are expressed with the following equations (5) and (6):

$$(fx\_AVE, fy\_AVE) = ((fx1 + fx2 + \ldots + fxINNUM)/INNUM/INNUM, (fy1 + fy2 + \ldots + fyINNUM)/INNUM) \quad (5)$$

$$(fpx(i), fpy(i)) = (fx\_AVE - fxi, fy\_AVE - fyi) \quad (6)$$

In the embodiment, the background removing unit 17 functions as a part of the correcting unit, and is provided for rendering a region of the facial image other than the facial region uniform. More specifically, according to the facial region detected with the facial image detecting unit 14, the background removing unit 17 is configured to fill with white a background of an outer region outside the facial region of each of the facial images corresponding to all image IDs stored in the photograph image information 13c in the arrangement table 13a stored in the memory 13.

In the embodiment, it may be configured such that the background removing unit 17 fills a background with a gradation pattern toward outside the facial region to make an edge of the facial region blurred, thereby obtaining a natural background image. When the user specifies the background ON/OFF 20a (BG_MATERIAL) through the parameter inputting unit 20, it may be configured such that the background removing unit 17 fills a background with a background removal color or an image the user specified.

Further, when the user set the background ON/OFF 20a (BG_FLG) to background OFF, it may be configured such that the background removing unit 17 does not fill a background, so that the image data are bypassed and a background of an original image is used. After the process described above, the background removing unit 17 writes the facial image in the same address in the memory 13 as before.

In the embodiment, the image correcting unit 18 is provided for correcting the facial images corresponding to all image IDs stored in the photograph image information 13c in the arrangement table 13a stored in the memory 13 according to the results of the facial correction ratio calculating unit 15 and the facial correction position calculating unit 16 after the background removing unit 17 performs the process. More specifically, the image correcting unit 18 is provided for enlarging, reducing, and moving in parallel an entire portion of the facial image. That is, the image correcting unit 18 is provided for enlarging or reducing the facial image according to the correction ratio fr(i) of the facial region calculated with the facial correction ratio calculating unit 15.

Further, the image correcting unit 18 is provided for moving the facial image in parallel according to the coordination (fpx(i) and fpy(i)) of the positional correction value fp(i) calculated with the facial correction position calculating unit 16. After the process described above, the image correcting unit 18 writes the facial image in the same address in the memory 13 as before.

In the embodiment, the layout unit 19 is provided for creating the layout image in which the facial images corresponding to all image IDs stored in the photograph image information 13c in the arrangement table 13a stored in the memory 13 are collected and arranged, and for transmitting the layout image to the image outputting unit 22. More specifically, in order to create the layout image, the layout unit 19 is provided for enlarging or reducing the facial image corresponding to each of the image IDs, and for calculating an arrangement position thereof according to a value specified by the user through the parameter inputting unit 20.

FIGS. 7(a) and 7(b) are schematic views showing an example of the facial images and the layout image of the image processing apparatus 10 according to the first embodiment of the present invention. More specifically, FIG. 7(a) is a schematic view showing an example of the facial images input in the image processing apparatus 10, and FIG. 7(b) is a schematic view showing an example of the layout image in which the facial images are collected and arranged.

In the examples shown in FIGS. 7(a) and 7(b), it is supposed that the user inputs through the parameter inputting unit 20 the following parameters: the one page photograph lateral number 20e (OUTX_NUM) is three and the one page photograph vertical number 20f (OUTY_NUM) is three. Further, the user inputs through the parameter inputting unit 20 specific values for the following parameters: the output sheet pixel number 20d (OUTX, OUTY), the upper edge margin 20g (MARGIN_T), the lower edge margin 20h (MARGIN_B), the right edge margin 20i (MARGIN_R), the left edge margin 20j (MARGIN_L), the width margin 20k (MARGIN_W), and the height margin 20l (MARGIN_H).

In the embodiment, the facial image corresponding to the image ID i is arranged in the layout image at an arrangement position (layx(i), layy(i)), and has an image size (lsizex, lsizey) after the facial image is enlarged or reduced. The arrangement position (layx(i), layy(i)) and the image size (lsizex, lsizey) are calculated with the following equations (7) to (10):

$$\text{lsizex} = \text{OUTX} - \text{MARGIN\_}R - \text{MARGIN\_}L - (\text{MARGIN\_}W \times (\text{OUTX\_NUM} - 1))/\text{OUTX\_NUM} \quad (7)$$

$$\text{lsizey} = \text{OUTY} - \text{MARGIN\_}R - \text{MARGIN\_}T - \text{MARGIN\_}B - (\text{MATGIN\_}H \times (\text{OUTY\_NUM} - 1))/\text{OUTY\_NUM} \quad (8)$$

$$\text{latx}(i) = \text{MARGIN\_}L + (\text{leizex} + \text{MARGIN\_}W) \times ((i-1) \% \text{ OUTX\_NUM}) $$

$$\text{laty}(i) = \text{MARGIN\_}T + (\text{leizey} + \text{MARGIN\_}H) \times \text{INT}((i-1)/\text{OUTY\_NUM}) \quad (10)$$

where A % B represents a remainder of A/B, and INT(A) represents an integer of A.

In the embodiment, the image outputting unit 22 is provided for converting the layout image received from the layout unit 19 into an output format, and for storing or outputting the layout image. The output format includes a PDF (Portable Document Format), a compressed image JPEG, a PDJ (Post Description Language) to be printed with a printer, and the like.

Figure 8:
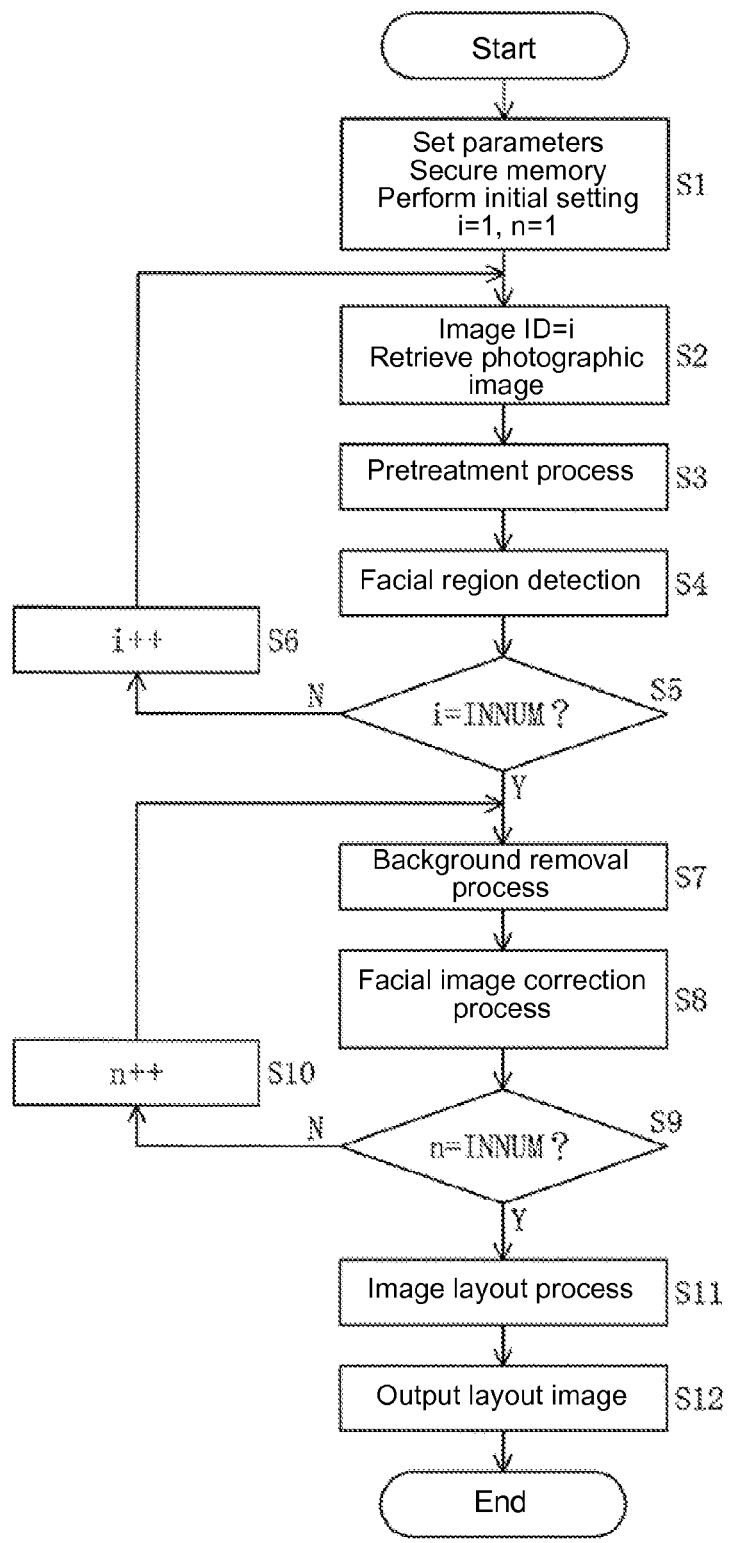
FIG. 8 is a flow chart showing an operation of the image processing apparatus according to the first embodiment of the present invention.

An operation of the image processing apparatus 10 will be explained next. FIG. 8 is a flow chart showing the operation of the image processing apparatus 10 according to the first embodiment of the present invention.

In step S1, the user sets the parameters, secures a region in the memory 13, and performs an initial setting. More specifically, the user operates the parameter inputting unit 20 as the user interface to perform the initial setting to input one to the variable n and the variable i. Further, the user selects the parameters from the background ON/OFF 20a (BG_FLG) to the right edge margin 20i (MARGIN_R), and from the left edge margin 20j (MARGIN_L) to the input photograph list 20m (INFILES) shown in FIG. 2. Then, the user pushes the print button or the save button on the menu bar 34 in the application image 31. Accordingly, the parameters are set and transmitted to the image inputting unit 11, the background removing unit 17, and the layout unit 19. At the same time, the region of the arrangement table 13a in the memory 13 is secured corresponding to the input photographic image number 20c (INNUM).

In step S2, the image inputting unit 11 retrieves the photographic image, so that the image inputting unit 11 retrieves the facial image of each individual from the storage unit. More specifically, the image inputting unit 11 reads the path at an i-th arrangement position of the input photograph list 20m (INFILES) received from the parameter inputting unit 20, so that the image inputting unit 11 retrieves the facial image of the corresponding image file. Then, the image inputting unit 11 attaches the image ID i to the facial image thus retrieved, and stores the facial image in the pointer of the photograph image information 13c in the arrangement table 13a stored in the memory 13.

In step S3, the image size adjusting unit 12 and the brightness adjusting unit 21 perform the pretreatment on the facial image, i.e., the pretreatment process. More specifically, the image size adjusting unit 12 and the brightness adjusting unit 21 retrieve the facial image with the image ID 1 stored in the memory 13. Then, the image size adjusting unit 12 adjusts the image size to a specific size, and the brightness adjusting unit 21 adjusts brightness of the facial image. After the pretreatment, the facial image is stored in the memory 13 at the same address as before.

In step S4, the facial image detecting unit 14 performs the facial region detection. More specifically, the facial image detecting unit 14 retrieves the facial image with the image ID i stored in the memory 13, and detects the facial region of the facial image. In particular, the facial image detecting unit 14 detects the facial region center point coordinate 52 (fxi, fyi), the facial region long axis length 53 (fli), and the facial region short axis length 54 (fsi) as the parameters indicating the facial region. The parameters thus detected are stored in the specific region in the memory 13 secured as the image ID i.

In step S5, the image processing apparatus 10 determines whether the variable i is equal to INNUM. More specifically, the image processing apparatus 10 determines whether the variable i is equal to the input photographic image number 20c (INNUM). In step S6, when the image processing apparatus 10 determines that the variable i is not equal to INNUM, one is added to the variable i, and the image inputting unit 11 retrieves the photographic image, thereby repeating the process described above.

In step S7, when the image processing apparatus 10 determines that the variable i is equal to INNUM, the background removing unit 17 performs the background removal process. More specifically, the background removing unit 17 retrieves the facial image with the image ID i stored in the memory 13, and performs the background removal process according to the background ON/OFF 20a (BG_FLG) and the background removal color/image 20b (BG_MATERIAL) received from the parameter inputting unit 20. After the background removal process is performed on the facial image, the facial image is stored in the memory 13 at the same address as before.

In step S8, the facial correction ratio calculating unit 15, the facial correction position calculating unit 16, and the image correcting unit 18 performs the facial image correction process. More specifically, the image correcting unit 18 retrieves the facial image with the image ID i stored in the memory 13, so that the image correcting unit 18 enlarges or reduces, and moves the facial image. First, the facial correction ratio calculating unit 15 calculates the correction ratio fr(i). Then, the facial correction position calculating unit 16 calculates the correction position (fpx(i), fpy(i)). Accordingly, the image correcting unit 18 corrects the facial image with the image ID i using the correction ratio fr(i) and the correction position (fpx(i), fpy(i)). After the facial image correction process, the facial image is stored in the memory 13 at the same address as before.

In step S9, the image processing apparatus 10 determines whether the variable n is equal to INNUM. More specifically, the image processing apparatus 10 determines whether the variable n is equal to the input photographic image number 20c (INNUM). In step S10, when the image processing apparatus 10 determines that the variable n is not equal to INNUM, one is added to the variable n, and the background removing unit 17 performs the background removal process, thereby repeating the process described above.

In step S11, when the image processing apparatus 10 determines that the variable n is equal to INNUM, the layout unit 19 performs the image layout process. More specifically, the layout unit 19 retrieves all of the facial images with the image ID from 1 to INNUM stored in the memory 13, so that the layout unit 19 creates the layout image in which the facial images thus retrieved are collected and arranged.

In the image layout process, the layout unit 19 creates the layout image according to the following parameters received from the parameter inputting unit 20: the output sheet pixel number 20d (OUTX, OUTY); the one page photograph lateral number 20e (OUTX_NUM) indicating the number of facial photographs arranged laterally; the one page photograph vertical number 20f (OUTY_NUM) indicating the number of the facial photographs arranged vertically; the upper edge margin 20g (MARGIN_T) indicating an upper edge margin of the layout image; the lower edge margin 20h (MARGIN_B) indicating the lower edge margin of the layout image; the right edge margin 20i (MARGIN_R) indicating the right edge margin of the layout image; the left edge margin 20j (MARGIN_L) indicating the left edge margin of the layout image; the width margin 20k (MARGIN_W) indicating the width margin of the layout image; and the height margin 20l (MARGIN_H) indicating the height margin of the layout image.

In step S12, the image outputting unit 22 outputs the layout image. More specifically, after the layout unit 19 creates the layout image, the image outputting unit 22 converts into a specific output format, and stores or outputs the layout image.

As described above, in the embodiment, the image processing apparatus 10 is provided with the facial correction ratio calculating unit 15, the facial correction position calculating unit 16, and the image correcting unit 18. Accordingly, it is possible to adjust the differences of the facial images of each individual in the sizes of the facial regions and the positions of the facial regions. Further, the image processing apparatus 10 is provided with the brightness adjusting unit 21 and the background removing unit 17. Accordingly, even when the facial images are taken under different circumstances and conditions, it is possible to adjust the differences in brightness and contrast of the facial images, thereby obtaining a uniform background.

The flow chart shown in FIG. 8 will be explained next. In step S1, the user sets the parameters, secures the region in the memory 13, and performs the initial setting. In step S2, the image inputting unit 11 retrieves the photographic image. In step S3, the image size adjusting unit 12 and the brightness adjusting unit 21 perform the pretreatment process. In step S4, the facial image detecting unit 14 performs the facial region detection. In step S5, the image processing apparatus 10 determines whether the variable i is equal to INNUM. When the image processing apparatus 10 determines that the variable i is equal to INNUM, the process proceeds to step S7. When the image processing apparatus 10 determines that the variable i is not equal to INNUM, the process proceeds to step S6.

In step S6, one is added to the variable i. In step S7, the background removing unit 17 performs the background removal process. In step S8, the facial correction ratio calculating unit 15, the facial correction position calculating unit 16, and the image correcting unit 18 performs the facial image correction process. In step S9, the image processing apparatus 10 determines whether the variable n is equal to INNUM. When the image processing apparatus 10 determines that the variable n is equal to INNUM, the process proceeds to step S11. When the image processing apparatus 10 determines that the variable n is not equal to INNUM, the process proceeds to step S10. In step S10, one is added to the variable n. In step S11, the layout unit 19 performs the image layout process. In step S12, the image outputting unit 22 outputs the layout image, thereby completing the process.

As described above, the image processing apparatus 10 is provided with the brightness adjusting unit 21 and the background removing unit 17. Accordingly, even when the facial images are taken under different circumstances and conditions, it is possible to adjust the differences in brightness and contrast of the facial images, thereby obtaining a uniform background and the layout image with high quality.

Second Embodiment

A second embodiment of the present invention will be explained next. Components in the second embodiment similar to those in the first embodiment are designated with the same reference numerals, and explanations thereof are omitted. The components in the second embodiment similar to those in the first embodiment provide operations and effects similar to those in the first embodiment, and explanations thereof are omitted.

Figure 9:
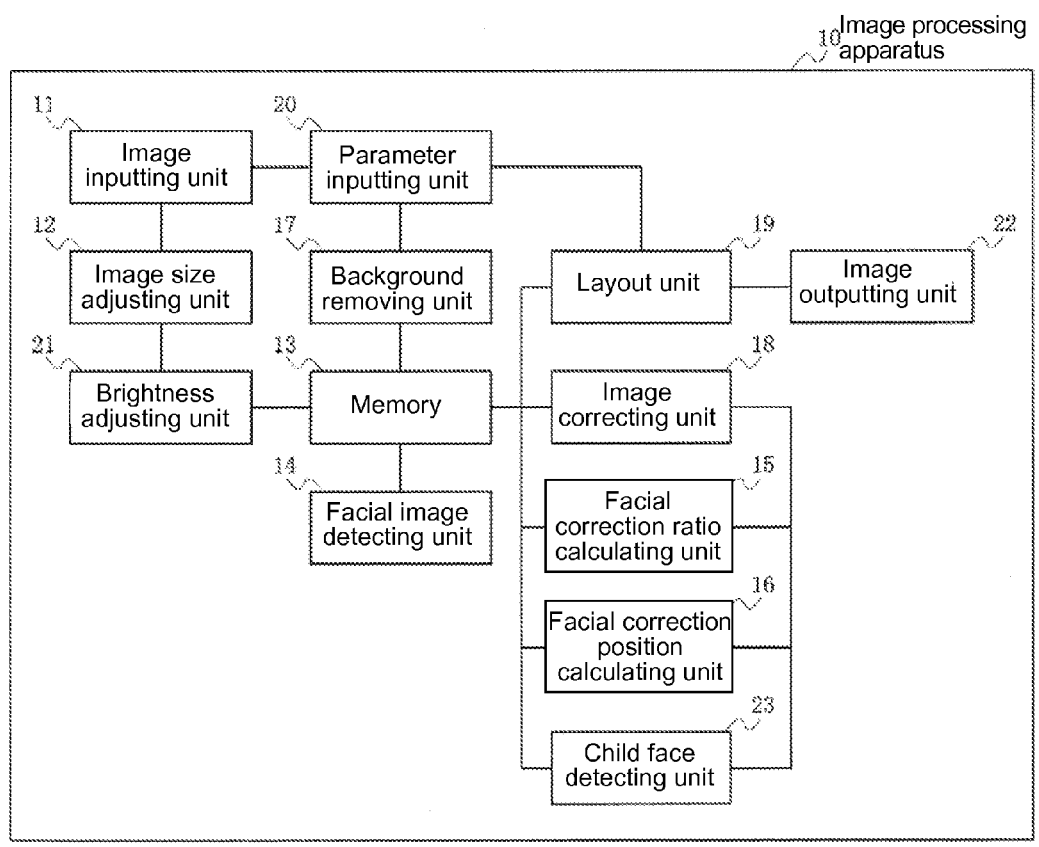
FIG. 9 is a block diagram showing a configuration of an image processing apparatus according to a second embodiment of the present invention.

FIG. 9 is a block diagram showing a configuration of the image processing apparatus 10 according to the second embodiment of the present invention.

As shown in FIG. 9, the image processing apparatus 10 is provided with a child face detecting unit 23 functioning as a part of the correcting unit for determining whether the facial image is a child face. More specifically, the child face detecting unit 23 is provided for determining whether a face of the facial image stored in the memory 13 is a child face through a determining method such as a template matching method, a neutral network method, and the likes.

Further, the child face detecting unit 23 may be configured to determine whether the facial image is a child face through a determining method disclosed in a reference such as Patent Reference (Japanese Patent Publication No. 2005-275935). The determining method has been well known, and a detailed explanation thereof is omitted. When the child face detecting unit 23 determine that the facial image is a child face, the child face detecting unit 23 is configured to store one in a child flag ch(i) (where i is the image ID), otherwise the child face detecting unit 23 stores zero in the child flag ch(i).

In the embodiment, the image correcting unit 18 is provided for correcting the facial images corresponding to all image IDs stored in the photograph image information 13c in the arrangement table 13a stored in the memory 13 according to the results of the facial correction ratio calculating unit 15, the facial correction position calculating unit 16 and the child face detecting unit 23 after the background removing unit 17 performs the process. More specifically, the image correcting unit 18 is provided for enlarging, reducing, and moving in parallel an entire portion of the facial image. That is, the image correcting unit 18 is provided for enlarging or reducing the facial image according to the correction ratio fr(i) of the facial region calculated with the facial correction ratio calculating unit 15 multiplied by a weight FRW according to the child flag ch(i). Further, the image correcting unit 18 is provided for moving the facial image in parallel according to the coordination (fpx(i) and fpy(i)) of the positional correction value fp(i) calculated with the facial correction position calculating unit 16 added by weights FPWX and FPWY according to the child flag ch(i).

In the embodiment, when the child flag ch(i) is one, the image correcting unit 18 is provided for enlarging or reducing the facial image at the ratio of the correction ratio fr(i) multiplied by the weight FRW. Similarly, when the child flag ch(i) is one, the image correcting unit 18 is provided for moving the facial image in parallel according to the coordination (fpx(i)+FPWX, fpy(i)+FPWY). After the process described above, the image correcting unit 18 writes the facial image in the same address in the memory 13 as before.

In the embodiment, the weights FRW, FPWX and FPWY may be static values stored in the image processing apparatus 10 in advance, or may be variables capable of being specified by the user through another method. Other components in the second embodiment are similar to those in the first embodiment, and explanations thereof are omitted.

Figure 10:
FIG. 10 is a schematic view showing an example of a layout image, in which facial images are collected and arranged, of the image processing apparatus according to the second embodiment of the present invention.
Figure 11:
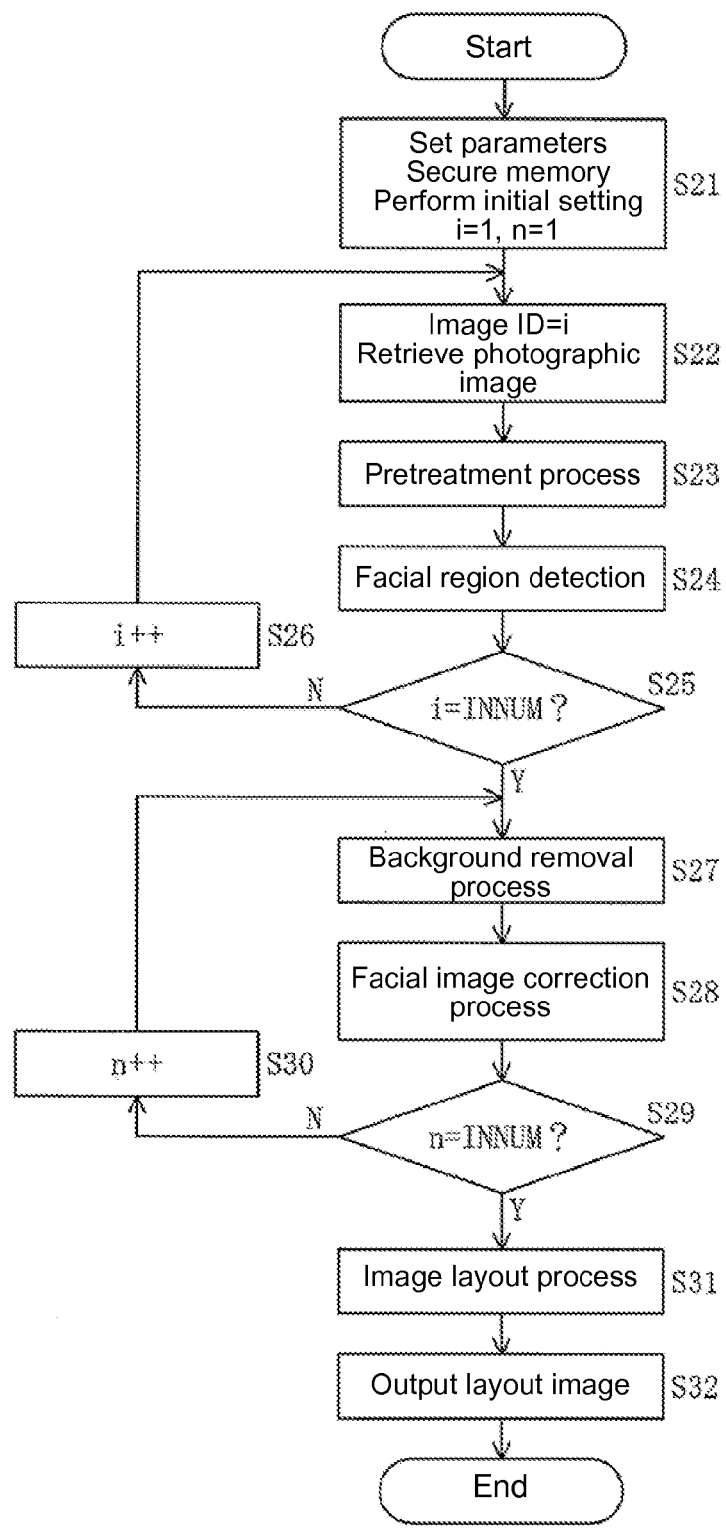
FIG. 11 is a flow chart showing an operation of the image processing apparatus according to the second embodiment of the present invention.

An operation of the image processing apparatus 10 will be explained next. FIG. 10 is a schematic view showing an example of the layout image, in which the facial images are collected and arranged, of the image processing apparatus 10 according to the second embodiment of the present invention. FIG. 11 is a flow chart showing the operation of the image processing apparatus 10 according to the second embodiment of the present invention.

In the second embodiment, the steps from step S21 for setting the parameters, securing the region in the memory 13, and performing the initial setting to step 27 of the background removal process are similar to those in the first embodiment, and explanations thereof are omitted.

In step S28, the facial correction ratio calculating unit 15, the facial correction position calculating unit 16, the child face detecting unit 23, and the image correcting unit 18 performs the facial image correction process. More specifically, the image correcting unit 18 retrieves the facial image with the image ID i stored in the memory 13, so that the image correcting unit 18 enlarges or reduces, and moves the facial image. First, the facial correction ratio calculating unit 15 calculates the correction ratio fr(i). Then, the facial correction position calculating unit 16 calculates the correction position (fpx(i), fpy(i)).

In the next step, the child face detecting unit 23 determines the child flag ch(i). Accordingly, the image correcting unit 18 corrects the facial image with the image ID i. More specifically, depending on whether the facial image is a child face, the correction ratio fr(i) and the correction position (fpx(i), fpy(i)) are weighed by the weights FRW, FPWX and FPWY. After the facial image correction process, the facial image is stored in the memory 13 at the same address as before. The remaining steps are similar to those in the first embodiment, and explanations thereof are omitted.

As described above, in the embodiment, the image processing apparatus 10 is provided with the child face detecting unit 23 and the image correcting unit 18. Accordingly, it is possible to determine whether each individual in the facial image is an adult or a child. When it is determined that the individual in the facial image is a child, it is possible to weight the correction ratio when the facial image is corrected.

Accordingly, it is possible to distinguish a position and a size of a child face from a position and a size of an adult face. For example, when it is desired that a child face stands out, it is possible to make a child face larger than an adult face through specifying the weight FRW greater than one. When it is desired that a child face becomes smaller than an adult face, it is possible to make a child face smaller than an adult face through specifying the weight FRW smaller than one. Further, it is possible to adjust a position of a child face through adjusting the weights FPWX and FPWY.

For example, when the weight FRW is set greater than one to make a child face stand out, and the weight FPWY is set to a lower position, the resultant layout image is created as shown in FIG. 10. As shown in FIG. 10, out of nine facial images, child facial images 61 and 62 are larger than other adult facial images, and the facial regions thereof are moved to a lower portion of the facial images according to values of the weights FRW, FPWX, and FPWY thus specified.

The flow chart shown in FIG. 11 will be explained next. In step S21, the user sets the parameters, secures the region in the memory 13, and performs the initial setting. In step S22, the image inputting unit 11 retrieves the photographic image. In step S23, the image size adjusting unit 12 and the brightness adjusting unit 21 perform the pretreatment process. In step S24, the facial image detecting unit 14 performs the facial region detection. In step S25, the image processing apparatus 10 determines whether the variable i is equal to INNUM. When the image processing apparatus 10 determines that the variable i is equal to INNUM, the process proceeds to step S27. When the image processing apparatus 10 determines that the variable i is not equal to INNUM, the process proceeds to step S26.

In step S26, one is added to the variable i. In step S27, the background removing unit 17 performs the background removal process. In step S28, the facial correction ratio calculating unit 15, the facial correction position calculating unit 16, the child face detecting unit 23 and the image correcting unit 18 performs the facial image correction process. In step S29, the image processing apparatus 10 determines whether the variable n is equal to INNUM. When the image processing apparatus 10 determines that the variable n is equal to INNUM, the process proceeds to step S31. When the image processing apparatus 10 determines that the variable n is not equal to INNUM, the process proceeds to step S30. In step S30, one is added to the variable n. In step S31, the layout unit 19 performs the image layout process. In step S32, the image outputting unit 22 outputs the layout image, thereby completing the process.

As described above, in the second embodiment, the image processing apparatus 10 is provided with the child face detecting unit 23 and the image correcting unit 18. Accordingly, similar to the first embodiment, it is possible to adjust the differences in brightness and contrast of the facial images, thereby obtaining a uniform background and the layout image with high quality.

In the first and second embodiments described above, the image processing apparatus 10 is the personal computer (PC), and may be any apparatus as far as the apparatus is capable of editing a plurality of facial images through executing a process application of the image processing apparatus 10. For example, the image processing apparatus 10 may includes a printer, an MFP (Multi Function Product), and the likes.

The disclosure of Japanese Patent Application No. 2010-026108, filed on Feb. 9, 2010, is incorporated in the application.

While the invention has been explained with reference to the specific embodiments of the invention, the explanation is illustrative and the invention is limited only by the appended claims.

What is claimed is:

1. An image processing apparatus comprising:
   an image inputting unit for inputting a plurality of facial images;
   a detecting unit for detecting a facial region of each of the facial images;
   a correction ratio calculating unit for calculating a correction ratio of the facial region of each of the facial images;
   a position calculating unit for calculating a positional deviation of the facial region of each of the facial images; and
   a correcting unit for enlarging or reducing each of the facial images according to the correction ratio and moving each of the facial images according to the positional deviation so that the correcting unit corrects a layout of each of the facial images,
   wherein said correction ratio calculating unit is arranged to calculate the correction ratio according to a ratio of an area of each of the facial regions to an average area of the facial regions.

2. The image processing apparatus according to claim 1, wherein said image inputting unit is arranged to normalize a brightness value of each of the facial images.

3. The image processing apparatus according to claim 1, wherein said detecting unit is arranged to detect a center point of each of the facial regions.

4. The image processing apparatus according to claim 1, wherein said position calculating unit is arranged to calculate the positional deviation as a difference between an average of coordinates of the center points of the facial regions and a coordinate of the center point of each of the facial regions.

5. The image processing apparatus according to claim 1, wherein said correcting unit is arranged to unify an area of each of the facial images except the facial region.

6. The image processing apparatus according to claim 1, wherein said correcting unit is arranged to move each of the facial images in parallel according to the positional deviation.

7. The image processing apparatus according to claim 1, wherein said correcting unit is arranged to determine whether each of the facial images includes a child face, and to weigh the correction ratio and the positional deviation accordingly.

8. A method of processing an image comprising the steps of:
   inputting a plurality of facial images with an image inputting unit;
   detecting a facial region of each of the facial images with a detecting unit;
   calculating a correction ratio of the facial region of each of the facial images with a correction ratio calculating unit according to a ratio of an area of each of the facial regions to, an average area of the facial regions;
   calculating a positional deviation of the facial region of each of the facial images with a position calculating unit; and
   enlarging or reducing each of the facial images according to the correction ratio and moving each of the facial images with a correcting unit according to the positional deviation so that a layout of each of the facial images is corrected with the correcting unit.

9. The method of processing the image according to claim 8, further comprising a step of normalizing a brightness value of each of the facial images with the image inputting unit.

10. The method of processing the image according to claim 8, further comprising a step of detecting a center point of each of the facial regions with the detecting unit.

11. The method of processing the image according to claim 8, wherein, in the step of calculating the positional deviation of the facial region of each of the facial images, said positional deviation is calculated as a difference between an average of coordinates of the center points of the facial regions and a coordinate of the center point of each of the facial regions with the position calculating unit.

12. The method of processing the image according to claim 8, further comprising a step of unifying an area of each of the facial images except the facial region with the correcting unit.

13. The method of processing the image according to claim 8, wherein, in the step of moving each of the facial images, each of said facial images is moved in parallel according to the positional deviation with the correcting unit.

14. The method of processing the image according to claim 8, further comprising steps of determining whether each of the facial images includes a child face, and weighing the correction ratio and the positional deviation accordingly with the correcting unit.

* * * * *